(12) United States Patent
Falvey et al.

(10) Patent No.: US 12,030,766 B2
(45) Date of Patent: Jul. 9, 2024

(54) HINGE ASSEMBLY FOR CONNECTING BARRELS

(71) Applicant: Evan Michael Falvey, Ankeny, IA (US)

(72) Inventors: Evan Michael Falvey, Ankeny, IA (US); Jeffrey J. Grant, Adair, IA (US); Jeremy M. Gettler, Adair, IA (US); Seth L. Wilson, Adair, IA (US)

(73) Assignee: Michael Evan Falvey, Ankeny, IA (US)

( * ) Notice: Subject to any disclaimer, the term of this patent is extended or adjusted under 35 U.S.C. 154(b) by 115 days.

(21) Appl. No.: 18/049,082

(22) Filed: Oct. 24, 2022

(65) Prior Publication Data
US 2024/0132337 A1 Apr. 25, 2024

(51) Int. Cl.
*B67C 3/30* (2006.01)
*F16C 11/04* (2006.01)

(52) U.S. Cl.
CPC ............... *B67C 3/30* (2013.01); *F16C 11/04* (2013.01)

(58) Field of Classification Search
CPC ......... B67C 3/30; F16C 11/04; B62B 2203/42
USPC ............................................................ 141/1
See application file for complete search history.

(56) References Cited

U.S. PATENT DOCUMENTS

| 2,703,248 | A | * | 3/1955 | Mauer | B65D 45/32 |
| | | | | | 292/241 |
| 3,815,767 | A | * | 6/1974 | Lund | B62B 1/264 |
| | | | | | 414/456 |
| 4,318,661 | A | | 3/1982 | Helm | |
| 4,797,050 | A | | 1/1989 | Habicht | |
| 5,586,692 | A | | 12/1996 | Livengood | |
| 6,213,352 | B1 | * | 4/2001 | Boyer, Jr. | B65G 65/24 |
| | | | | | 414/419 |
| 6,254,330 | B1 | | 7/2001 | Steffen et al. | |
| 6,379,034 | B1 | | 4/2002 | Schütz | |
| 2007/0059151 | A1 | | 3/2007 | Hager | |

FOREIGN PATENT DOCUMENTS

| CN | 104401923 A | 3/2015 |
| CN | 107720302 A | 2/2018 |
| DE | 29917369 U1 | 2/2000 |
| EP | 1251088 A1 | 10/2002 |

\* cited by examiner

*Primary Examiner* — Timothy L Maust
*Assistant Examiner* — Christopher M Afful
(74) *Attorney, Agent, or Firm* — McKee, Voorhees & Sease, PLC

(57) ABSTRACT

A hinge assembly is mountable on first and second large drums or barrels so that the first drum or barrel can be lifted or raised to drain liquid from the first drum or barrel into the second drum or barrel. The hinge assembly includes inner and outer plates which clamp to the rim of each drum to secure the hinge assembly to the drums. The plates may be adjustable to fit different rim dimensions. The hinge assembly does not penetrate, damage or alter the drums. An optional handle can be mounted to the hinge assembly to facilitate lifting of the first drum.

18 Claims, 19 Drawing Sheets

HINGE ASSEMBLY FOR CONNECTING BARRELS

TECHNICAL FIELD

The field of the invention is liquid transfer, and more particularly, transfer of liquid from a first barrel or drum into a second barrel or drum by connecting the barrels with a hinge assembly to allow the first barrel to be tipped upwardly to drain liquid from the first barrel to the second barrel.

BACKGROUND

Liquid is often stored in 55-gallon drums or barrels, or similar large containers. The liquid is typically pumped from such a barrel or container for use in various applications. However, the pump usually cannot remove all the liquid from the drum or barrel, such that there is a residual amount of liquid remaining in the drum or barrel after pumping is complete. This residual liquid goes to waste unless it can be poured or otherwise drained from the drum. The size of the standard 55-gallon drum makes it awkward and difficult to handle, even when nearly empty. Different types of devices have been designed to be positioned under the drum and then lift the drum so that the residual content can be poured out. However, such lifting devices may be large, heavy, and expensive.

Therefore, there is a need in the liquid containment industry for a simple device which can be attached to a 55 gallon drum or similar large container to allow the drum or container to be tipped up to drain residual liquids therefrom.

Accordingly, a primary objective of the present invention is the provision of a hinge connected to the tops of a pair of adjacent liquid containers to allow the near-empty container to be lifted to pour the contents into the other container.

A further objective of the present invention is the provision of a hinge device which quickly and easily attaches to the upper rims of adjacent 55-gallon drums to allow liquid from one drum to be poured into the other drum.

Another objective of the present invention is the provision of a hinge which clamps to the upper edges of adjacent first and second barrels to allow the first barrel to be tipped above the second barrel to empty liquid in the first barrel into the second barrel.

Still another objective of the present invention is the provision of a hinge attachable to liquid containing drums and a handle on the hinge to facilitate lifting of one drum above the other drum to pour the liquid contents from the lifted drum into the stationary drum.

Yet another objective is the provision of a method of transferring residual liquid in a nearly empty barrel into another barrel so as to eliminate waste of the residual liquid.

These and/or other objects, features, and advantages of the disclosure will be apparent to those skilled in the art. The present invention is not to be limited to or by these objects, features and advantages. No single embodiment need provide each and every object, feature, or advantage.

SUMMARY

A hinge assembly has mirror image sides clamped to first and second drums or barrels. Each side of the hinge assembly includes an inner plate adapted to engage the inside of an upper rim of one drum and an outer plate adapted to engage the exterior of the respective drum immediately below the rim. The first drum can then be tilted upwardly to drain liquid or fluid into the second drum. A hose and/or a funnel can be used to facilitate or direct drainage from the first drum to the second drum.

In a first embodiment, the inner and outer plates are not adjustable. In a second embodiment, both of the inner and outer plates on each side of the hinge assembly are adjustable to accommodate different rim configurations on the upper perimeter of the drums or barrels.

These and/or other objects, features, advantages, aspects, and/or embodiments will become apparent to those skilled in the art after reviewing the following brief and detailed descriptions of the drawings. Furthermore, the present disclosure encompasses aspects and/or embodiments not expressly disclosed but which can be understood from a reading of the present disclosure, including at least: (a) combinations of disclosed aspects and/or embodiments and/or (b) reasonable modifications not shown or described.

BRIEF DESCRIPTION OF THE DRAWINGS

FIG. 1 is a close up top view showing the hinge device of the present invention attached to the rim of two adjacent 55-gallon drums or barrels.

FIG. 2 is a perspective view showing the hinge assembly in a fully open orientation, not in use.

FIG. 3 is a perspective view showing the hinge assembly in a partially folded or pivoted orientation.

FIG. 4 is a perspective view showing the components of the hinge assembly partially disassembled.

FIG. 5 is a close up perspective view of the hinge assembly on the drums, with the first drum being fully tipped for draining residual liquids into the second drum.

FIG. 11 is an upper perspective view of the alternative embodiment of the hinge assembly, wherein the inner and outer plates are vertically adjustable, according to the present invention.

FIG. 12 is another upper perspective view of the adjustable embodiment shown in FIG. 11.

FIG. 13 is a lower perspective view of the adjustable embodiment.

FIG. 14 is a bottom view of the adjustable embodiment shown in FIG. 11.

FIG. 15 shows the inner plate at a lowered vertical position.

FIG. 16 shows the inner plate at a raised vertical position.

FIG. 17 shows the adjustable embodiment mounted on a pair of 55 gallon drums both on the floor.

FIG. 18 is an enlarged view of one end of the adjustable hinge assembly of FIG. 17.

FIG. 19 is a view similar to FIG. 17 with a drain hose attached to one drum and extending into the other drum.

FIG. 20 is a view showing one of the drums of FIG. 19 in a raised position.

DETAILED DESCRIPTION

Figure 1:
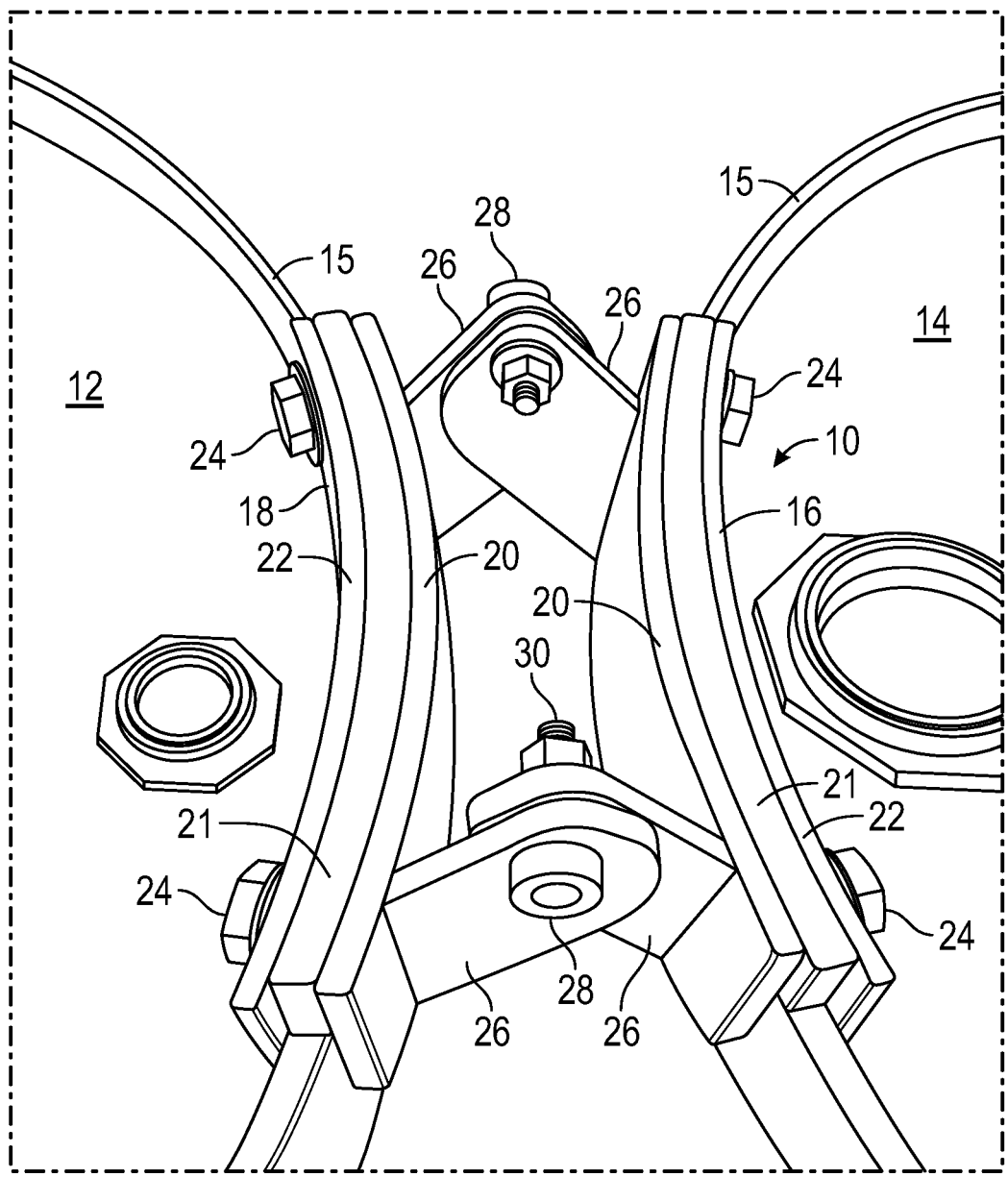
FIGS. 1-5 show a first embodiment of the hinge device of the present invention.
Figure 2:
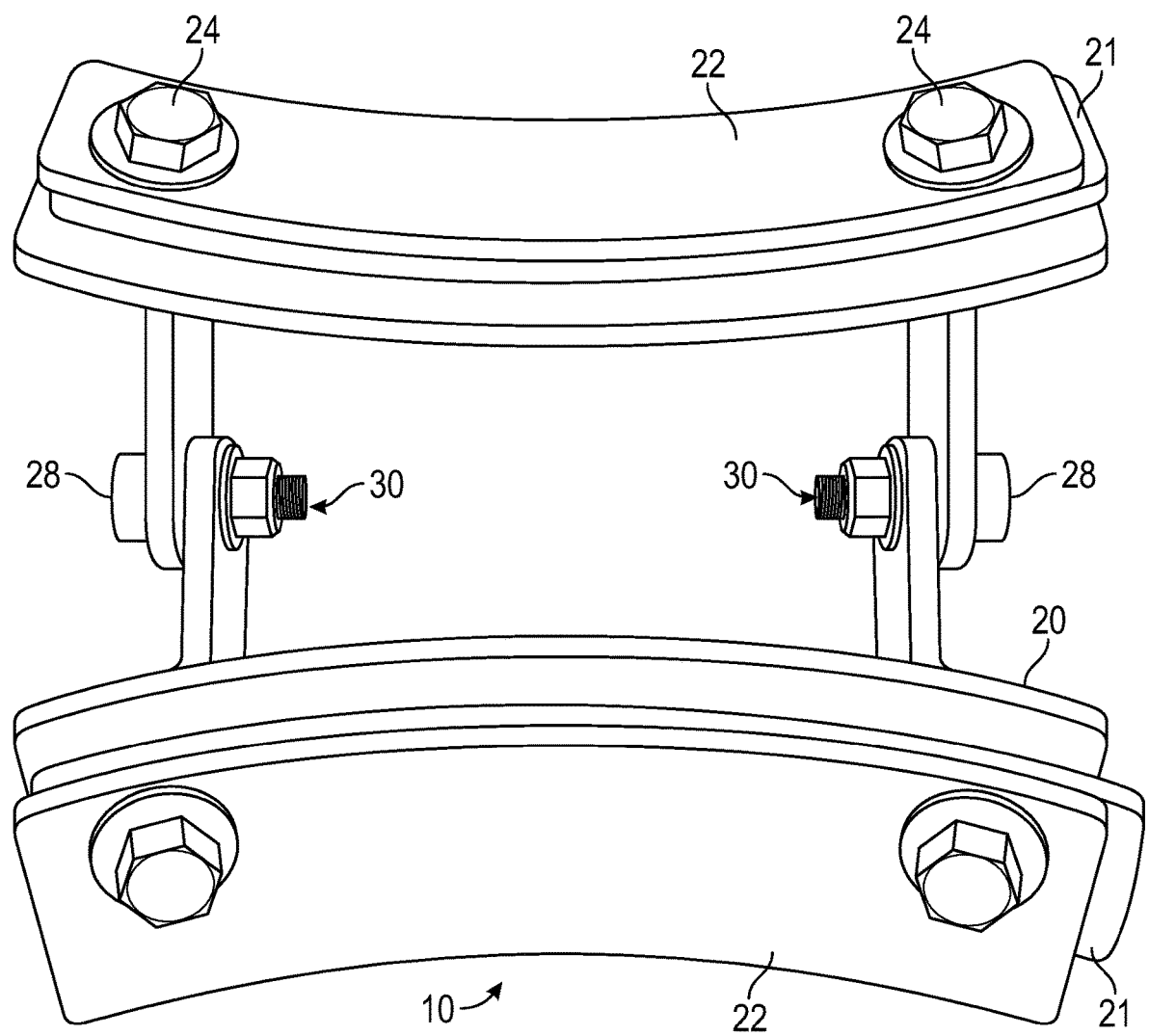
Figure 3:
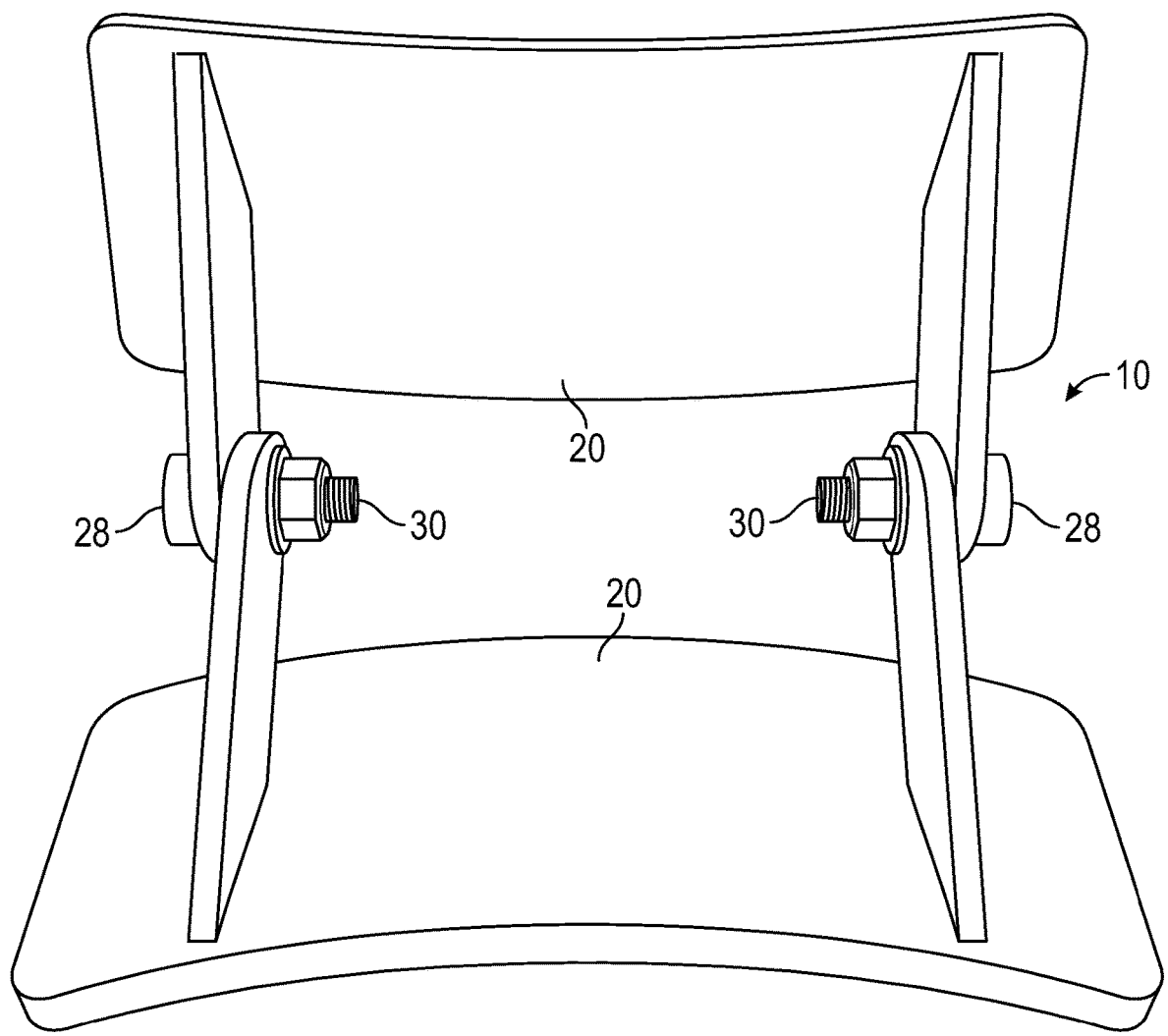
Figure 4:
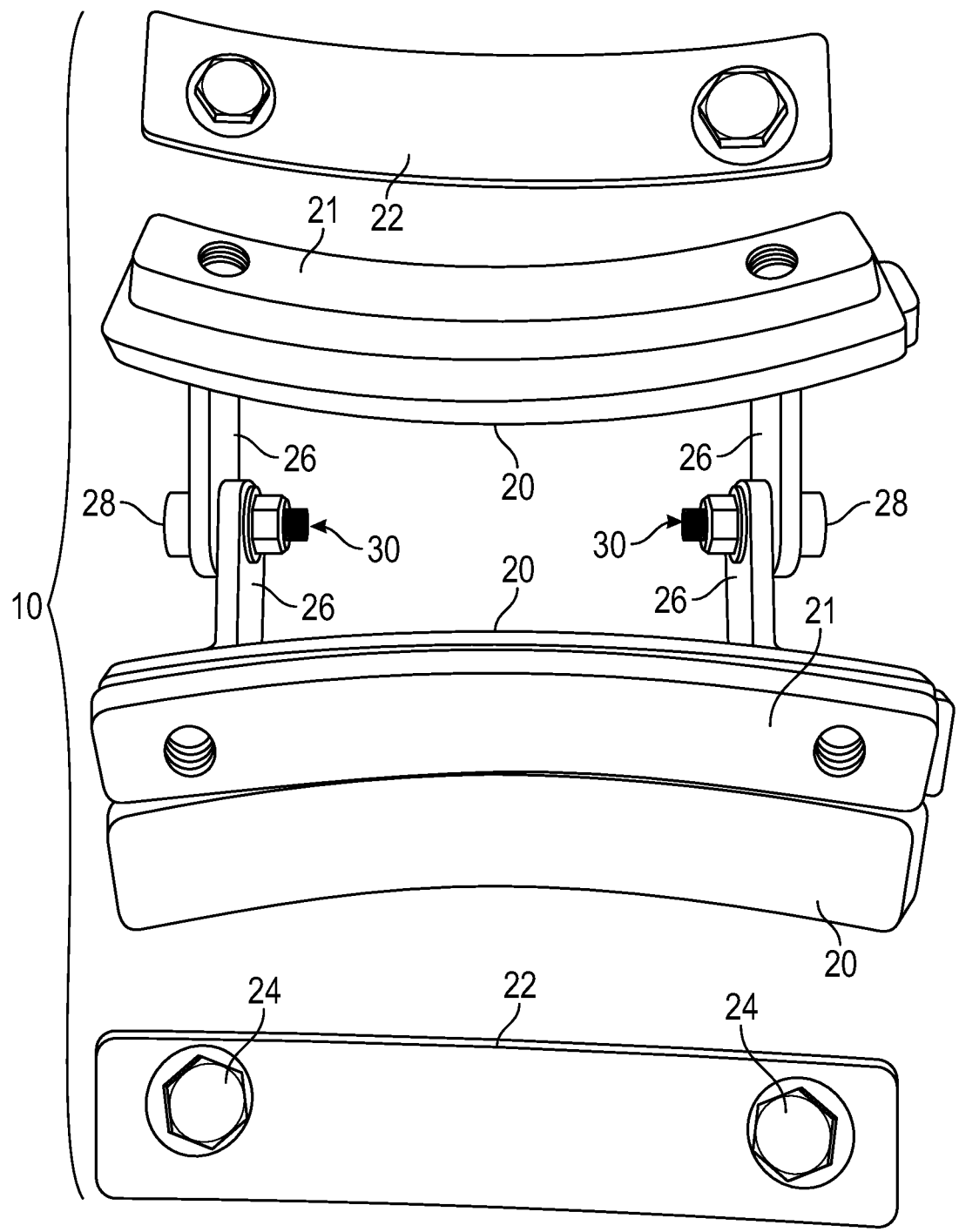
Figure 5:
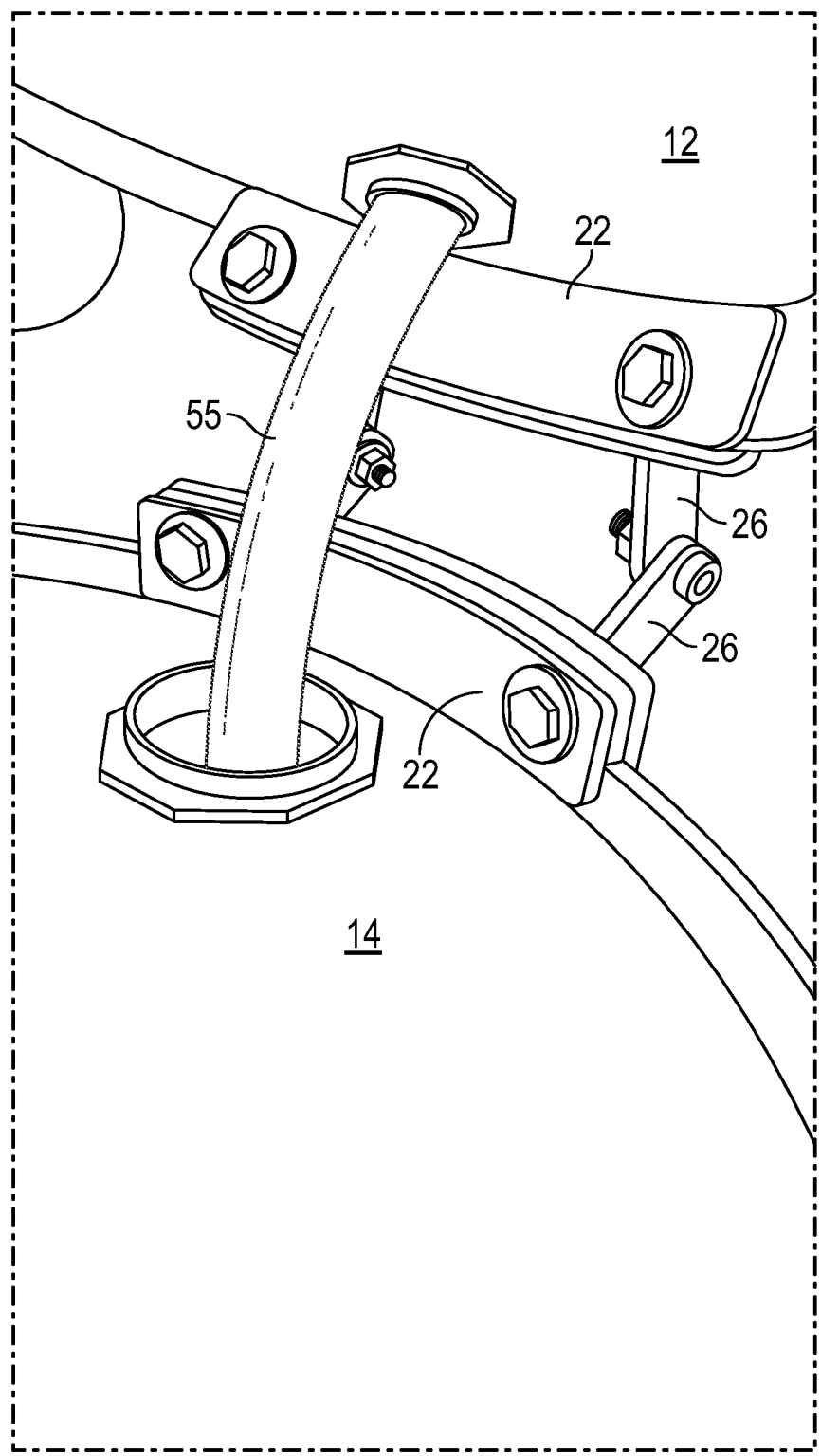
Figure 6:
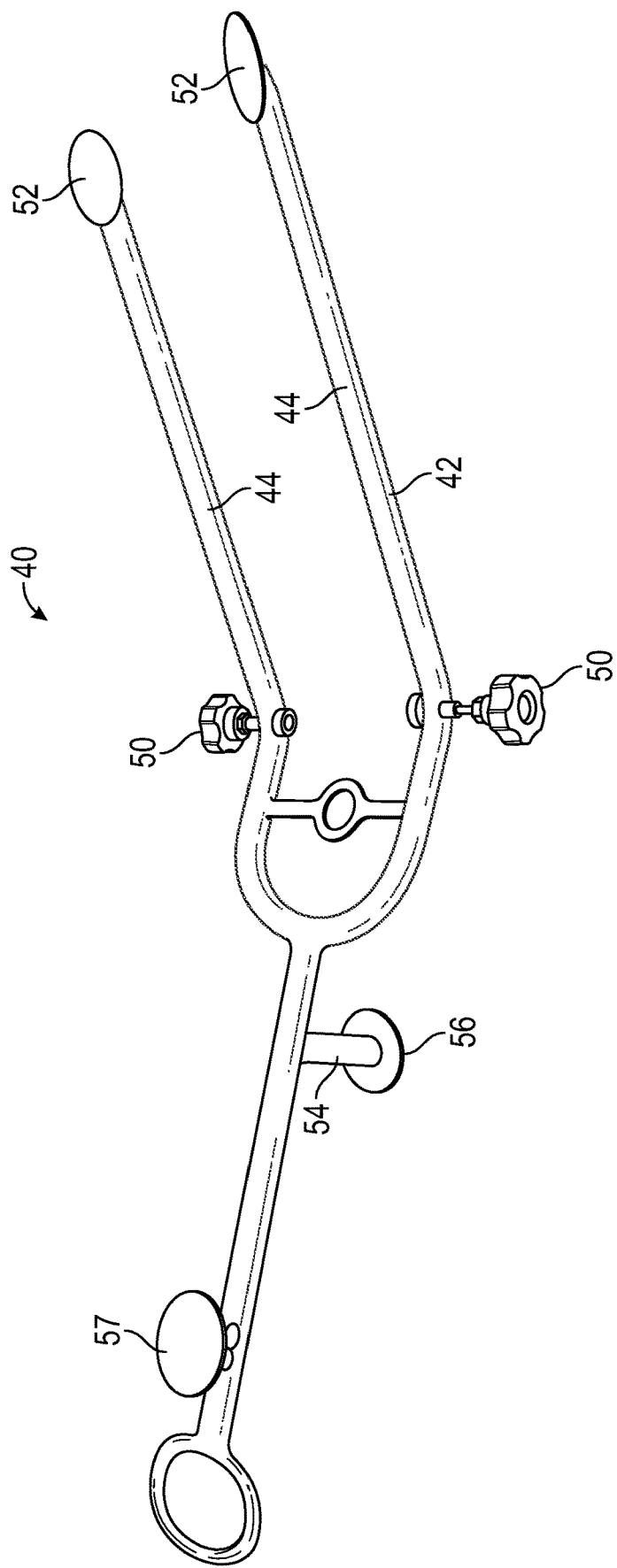
FIG. 6 is a perspective view of the handle which can optionally be used with the hinge assembly.

The hinge device or assembly of the present invention is generally designated by the reference numeral 10 in the drawings. The assembly 10 is intended for use on large liquid containers, such as 55 gallon drums or barrels 12 and 14. The hinge assembly 10 can be quickly and easily mounted to the drums 12, 14 to allow the first drum 12 to be manually lifted to pour, drain or consolidate the liquid in the first drum 12 into the second drum 14, which sits stationary.

More particularly, the hinge assembly 10 includes opposite mirror image sides 16, 18. Each side 16, 18 includes a curved outer plate or bar member 20 to matingly engage an upper exterior portion of the drum 12, 14, such as the exterior of the drum upper rim 15. The rim 15 may extend outwardly from the sidewall of the drum, in the form of a bead. Each plate 20 includes a notch or recess 21 extending horizontally into which the rim bead 15 extends, such that the bar 20 engages the drum sidewall below the rim 15. Each of the hinge sides 16, 18 also includes a second curved inner plate or bar member 22 adapted to reside on the interior of the upper rim 15 of the drum. A spacer plate 21 on the outer plate 20 resides above the rim 15 and defines a space between the plates to receive the rim 15. A portion of each plate or bar member 20, 22 extends above the rim 15 so that the members 20, 22 can be connected or secured together, such as by bolts 24, so that the plate or bar members 20, 22 are clamped to the drum rim 15. The plates 20, 22 have aligned holes for receiving the bolts 24. Preferably, the holes in one of the plates 20, 22 is threaded for threaded receipt of the bolt 24. Alternatively, the bolts 24 may extend beyond the plates 20, 22 for receipt of a nut (not shown). In a preferred embodiment, the bolts holes in the inner plate 22 is elongated in the form of a slot to allow adjustability of the plate 22 relative to the plate 20, and the bolt hole in plate 20 is threaded. Thus, each pair of inner and outer plates 20, 22 form a clamp for mounting the hinge assembly 10 to one of the drums 12, 14, with the drum rims 15 sandwiched between the plates 20, 22.

Each hinge side 16, 18 also includes a pair of arms 26 extending from the outer plates 20 toward the opposite side. The ends of the opposing arms 26 are bolted or pinned together, such as with bolts 28, so as to define a pivot axis 30 for the hinge assembly 10. The pivot axis is located vertically above the drum and laterally between the drums.

In use, the drums 12, 14 are positioned adjacent one another, as shown in FIG. 1. The hinge assembly or device 10 is then mounted to each drum 12, 14 via the curved outer and inner plate members 20, 22 and the bolts 24. Once the device 10 is clamped to the rim 15 of the drums 12, 14, the first drum 12, which preferably is nearly empty, can be manually lifted such that the drum 12 pivots about the axis 30 to a raised position, such that the residual liquid in the drum 12 drains into the drum 14 via a spout or hose 32. As an alternative to the spout or hose 32, a funnel can be placed in the top opening of the second drum 14 for receiving liquid from the first drum 12. After the contents of the first drum 12 are consolidated into the second drum 14, the drum 12 can be pivoted downwardly about the axis 30 to the floor or ground, and the hinge device 10 can be removed from the drums 12, 14.

Depending on the shape of the liquid container, the structure of the hinge assembly may be modified, without departing from the scope of the present invention. For example, the plate or bar members 20, 22 preferably match the shape of the container rim, whether curved or straight. Also, the bolts 28 may be replaced with a single elongated shaft, bolt or pin to define the pivot axis 30.

The hinge assembly 10 allows for controlled lifting and lowering of the drum 12 to empty liquid from the drum 12 into the drum 14. The hinge device 10 does not require modification of the liquid containers 12, 14, and does not penetrate or otherwise damage the drums. The simple design and small size of the hinge assembly 10 allows the assembly to be quickly and easily attached to the liquid containers, and easily stored and/or transported. The only tool needed for the device 10 is a wrench to tighten and loosen the bolts 24 for attaching and removing the device to the containers. As an alternative to the bolts 24, other clamping mechanisms can be utilized on the device 10 for mounting to the drums, barrels, or containers.

Figure 7:
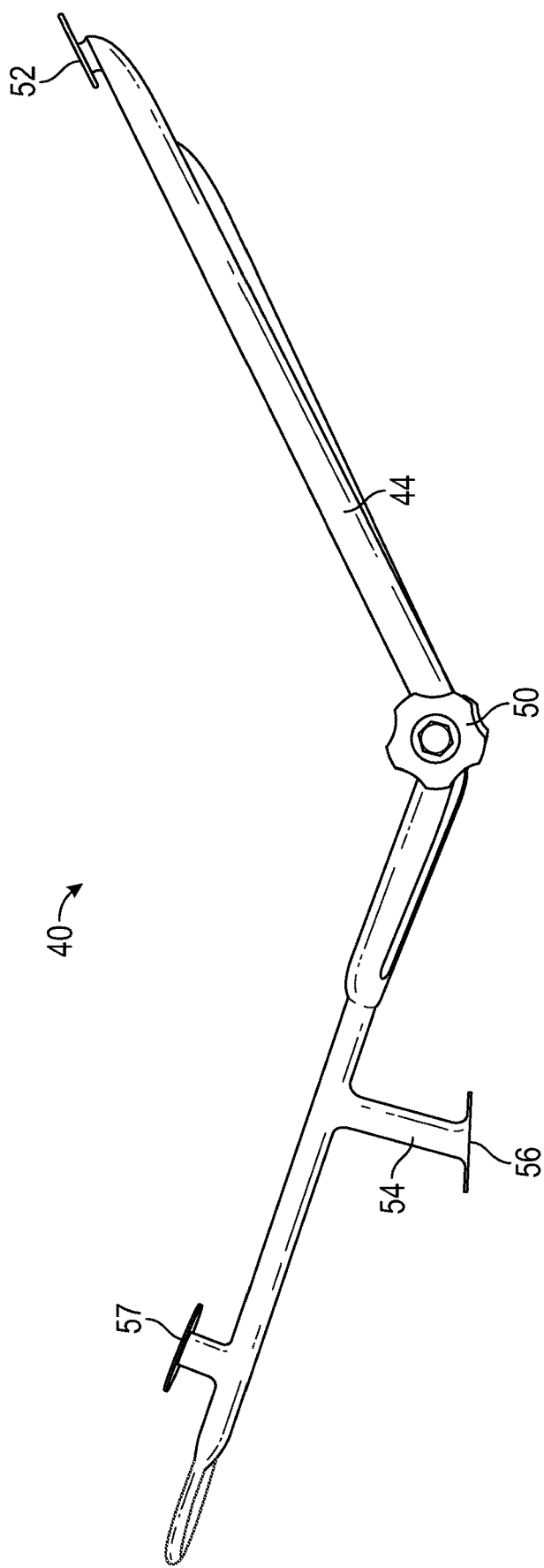
FIG. 7 is a side view of the handle.
Figure 8:
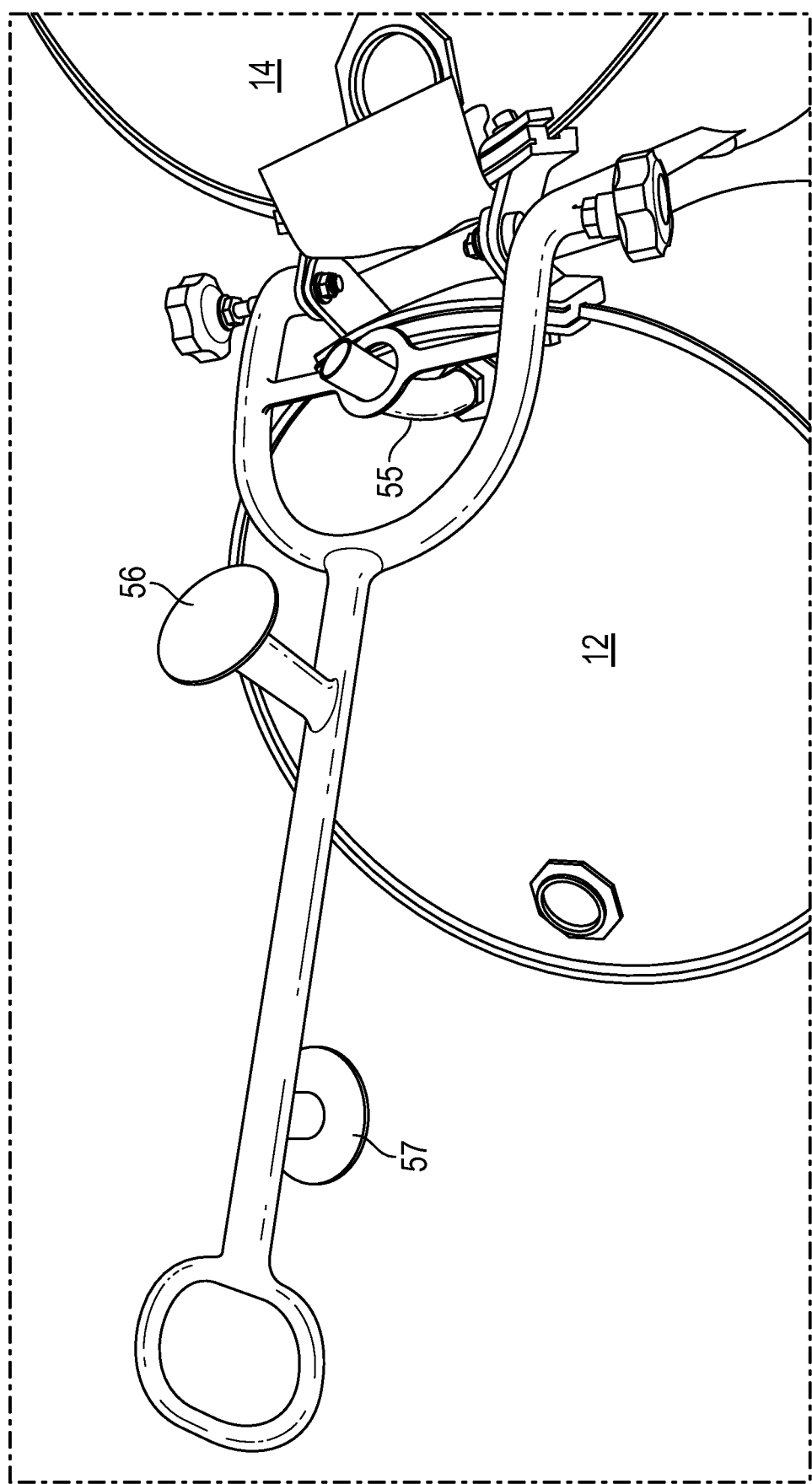
FIG. 8 is an upper perspective view showing the hinge assembly and the handle assembly connected to the first and second drums.
Figure 9:
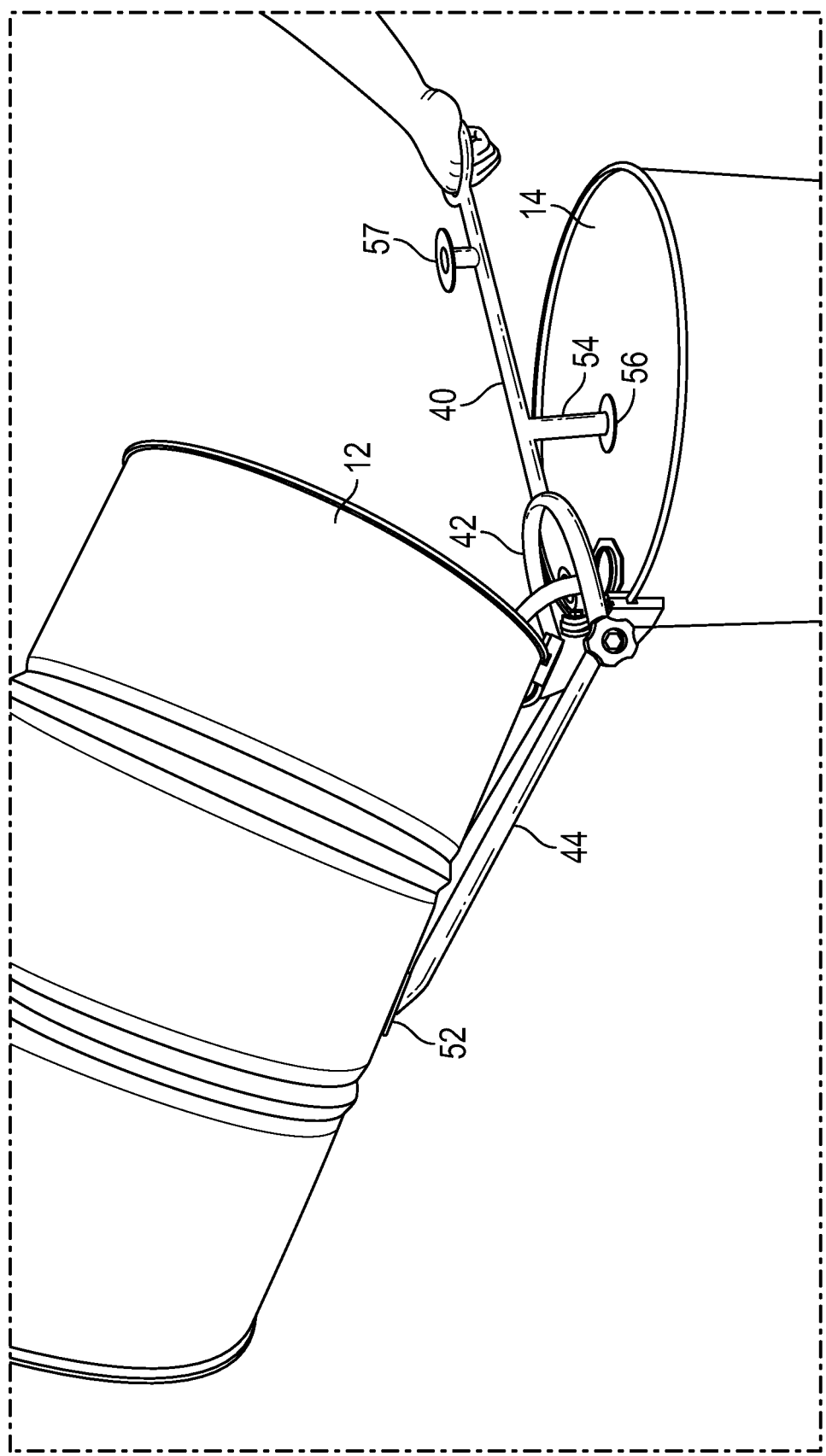
FIG. 9 is a side elevation view showing the handle installed on the hinge assembly, with the first drum partially tipped upwardly.
Figure 10:
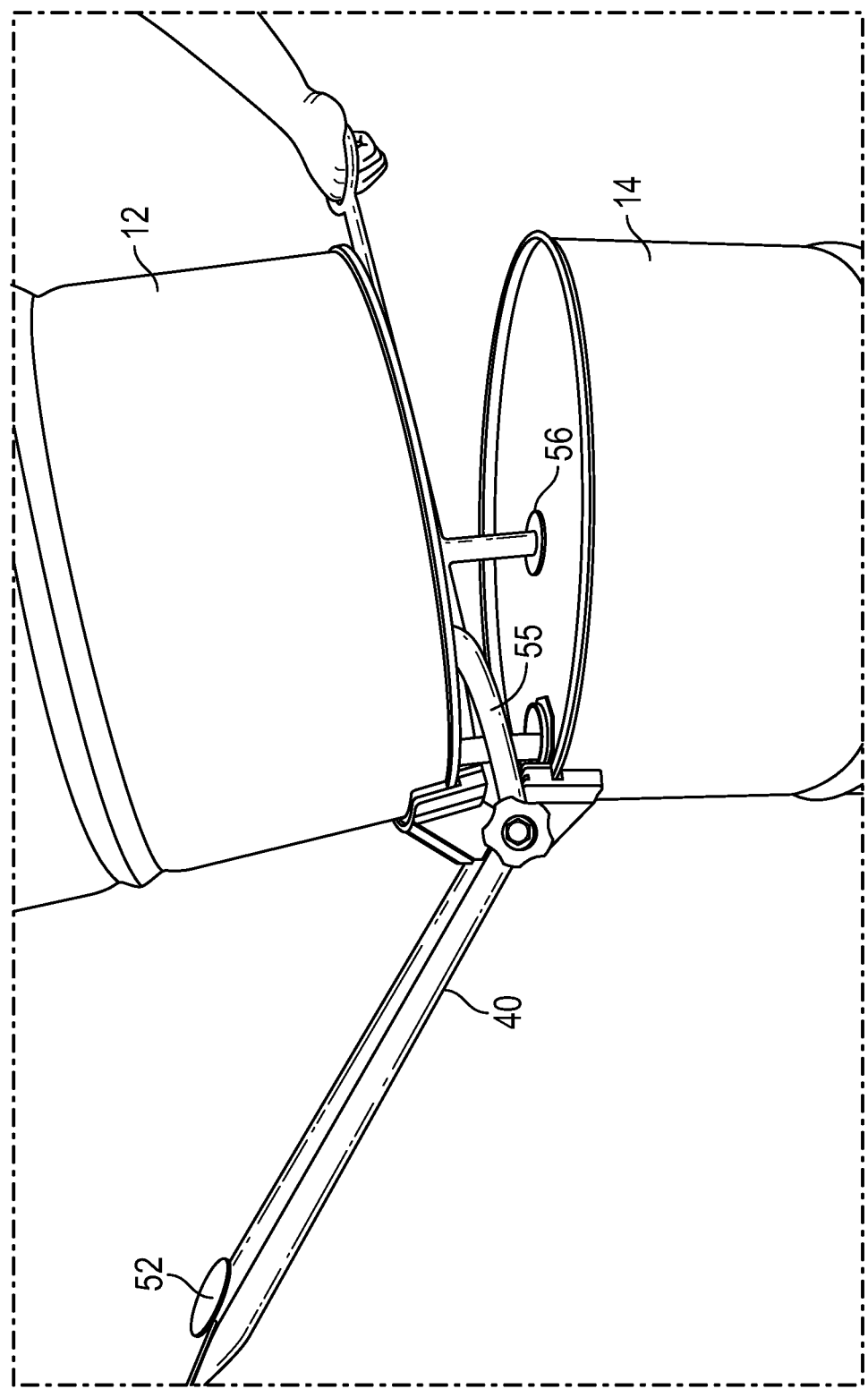
FIG. 10 is a side elevation view showing the first drum fully tipped upwardly using the handle.
Figure 11:
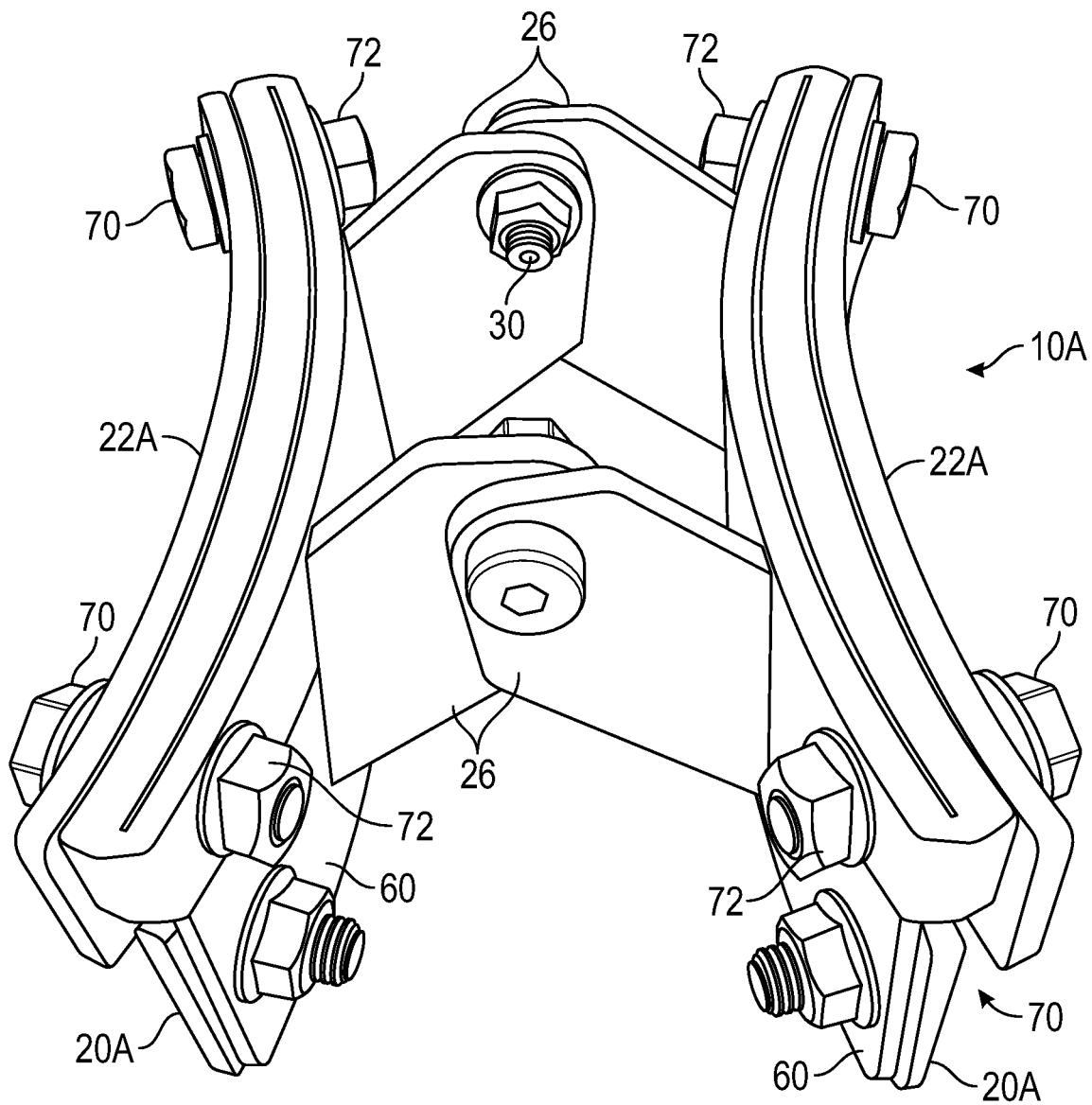
FIGS. 11-20 show an alternative embodiment of the hinge assembly.
Figure 12:
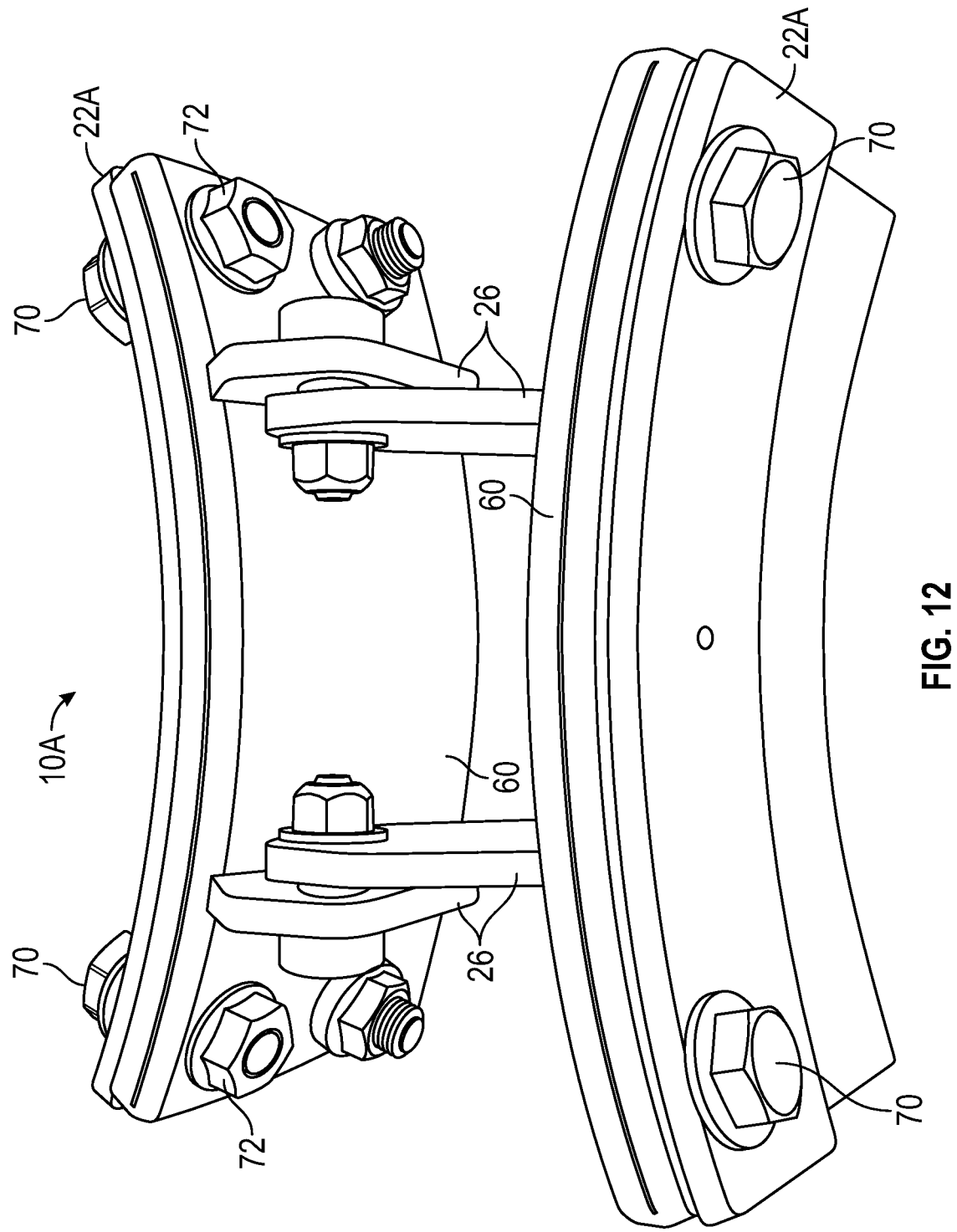
Figure 13:
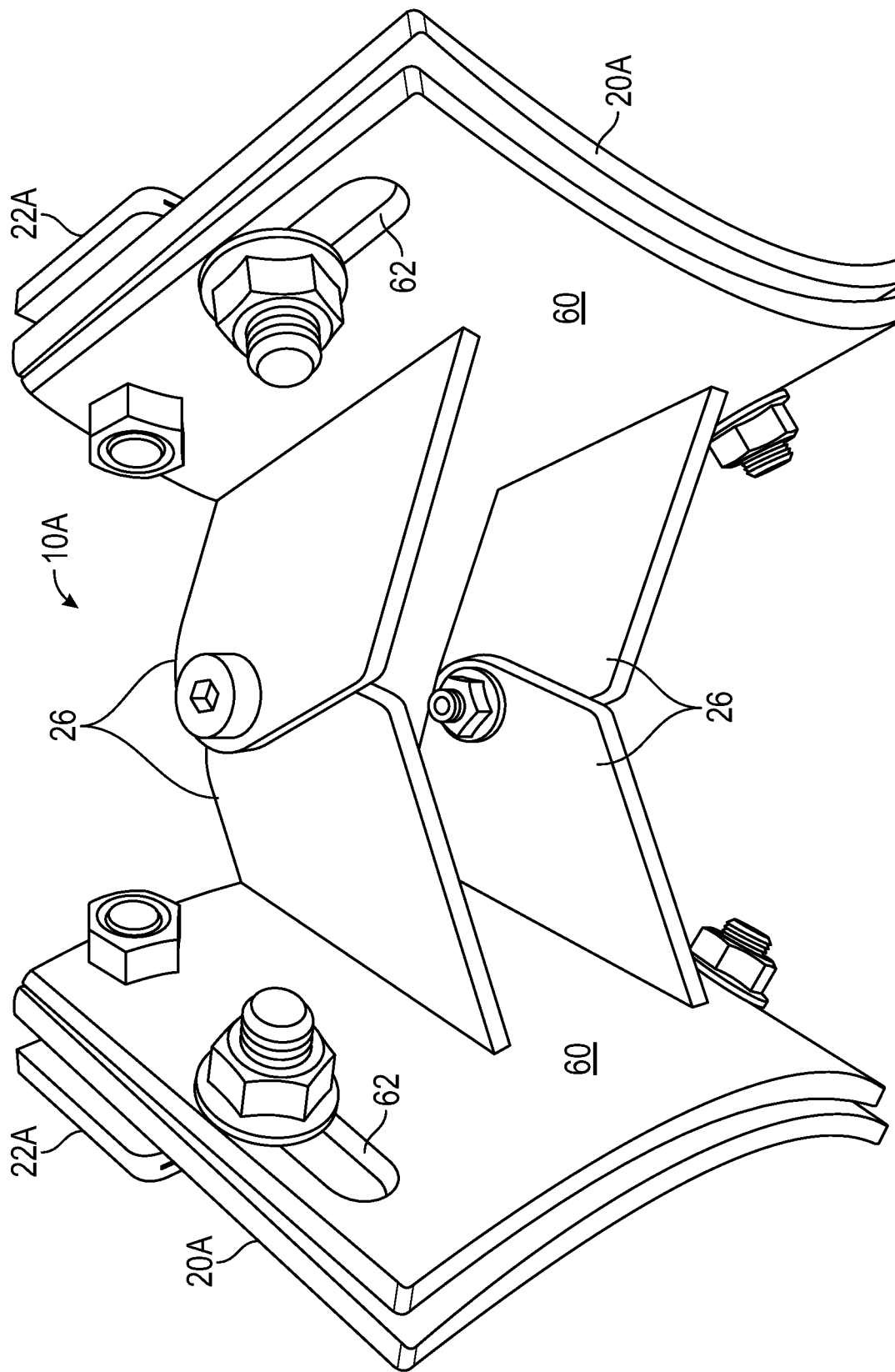
Figure 14:
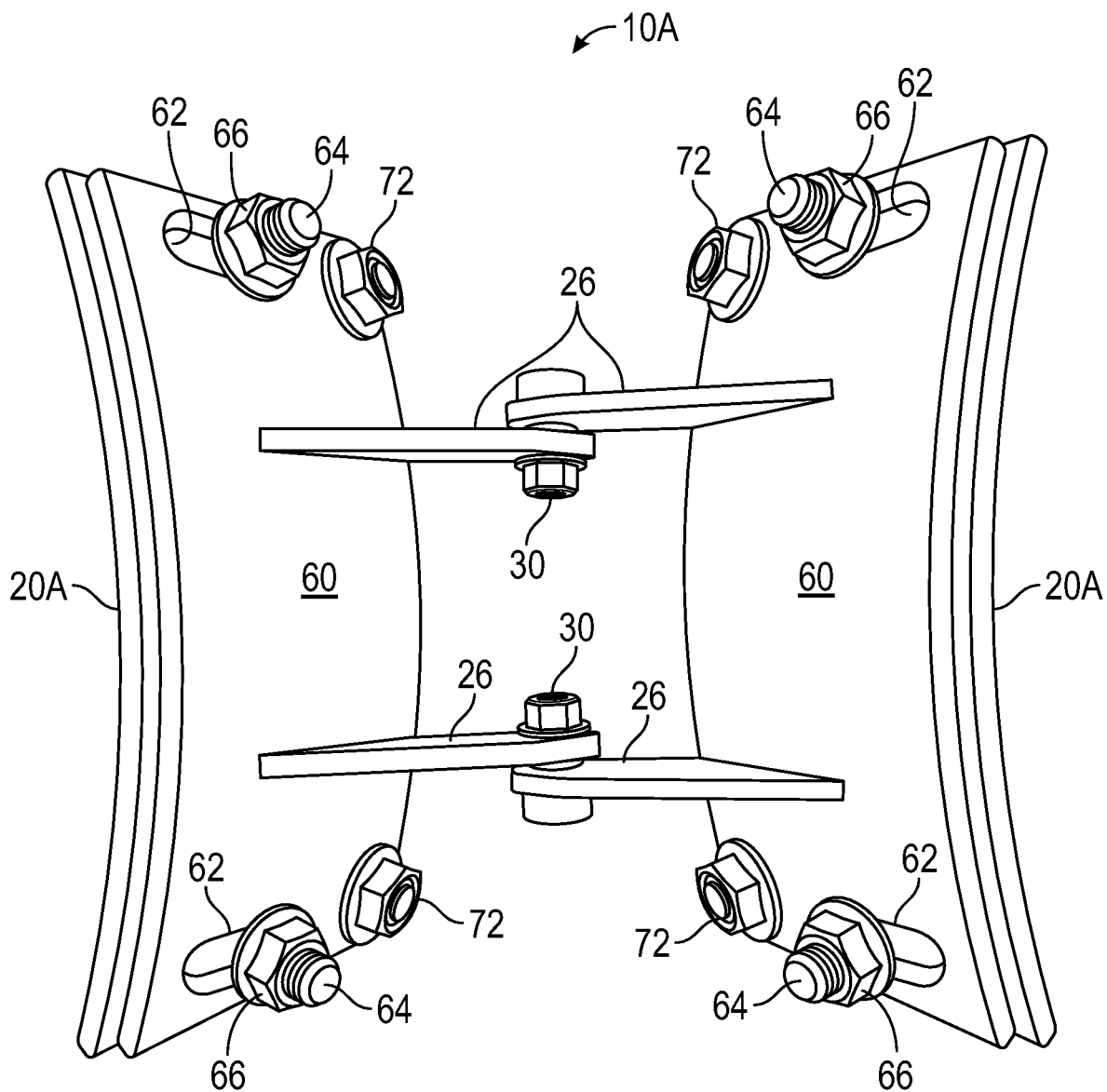
Figure 15:
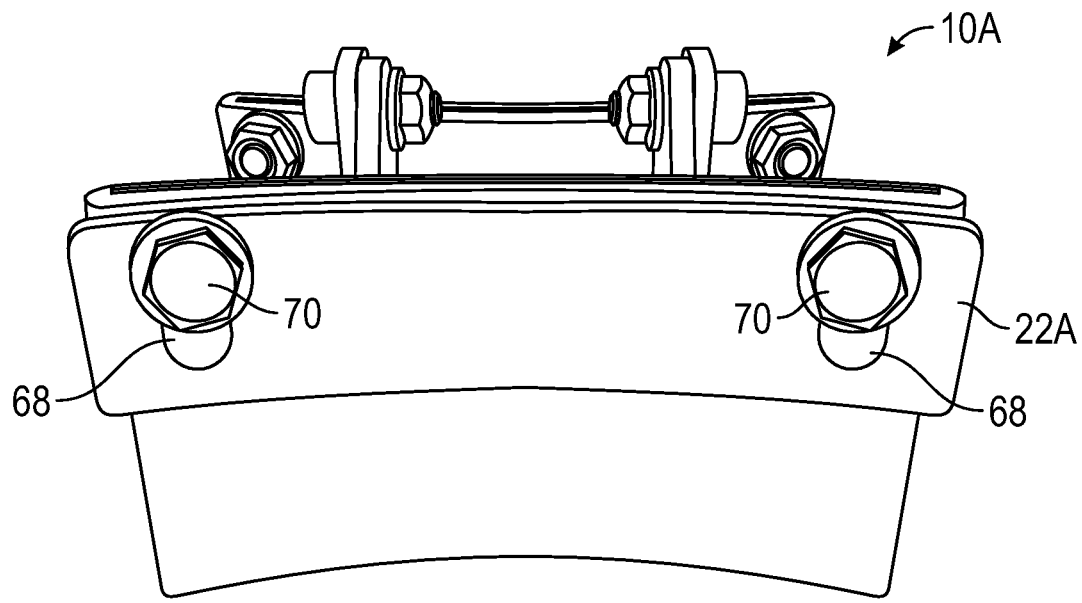
Figure 16:
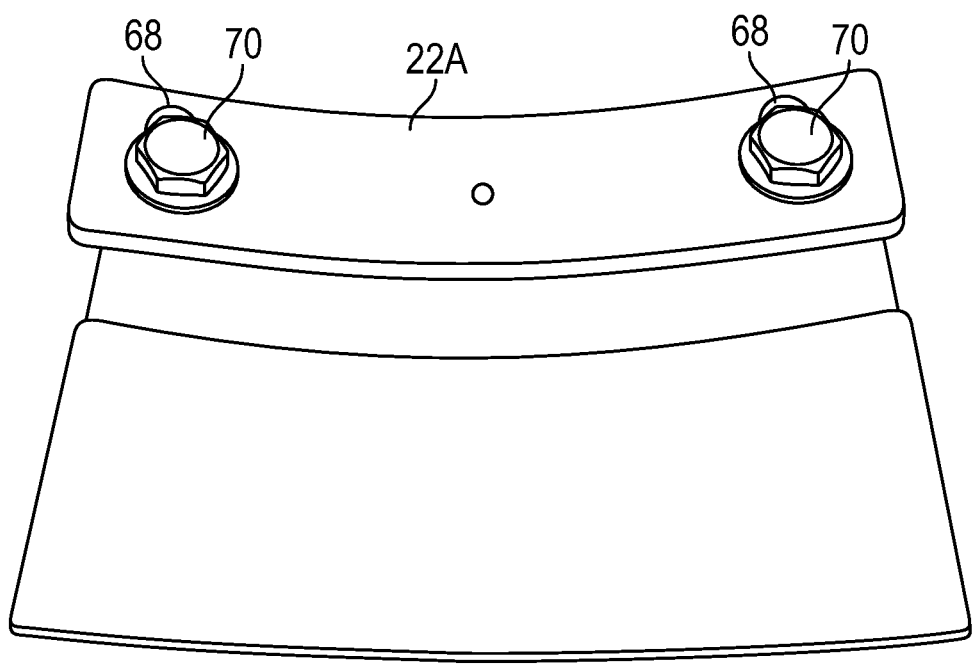
Figure 17:
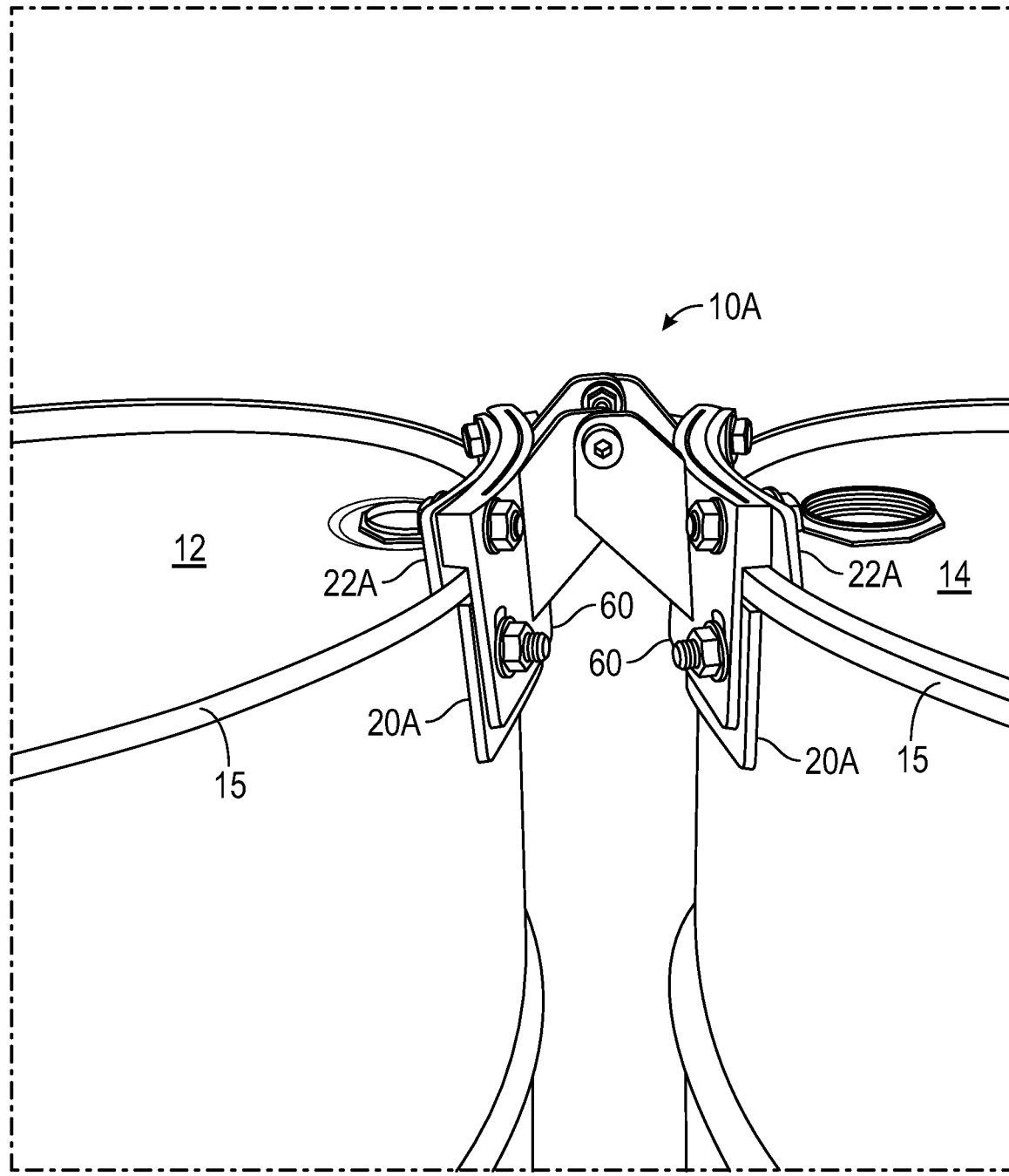
Figure 18:
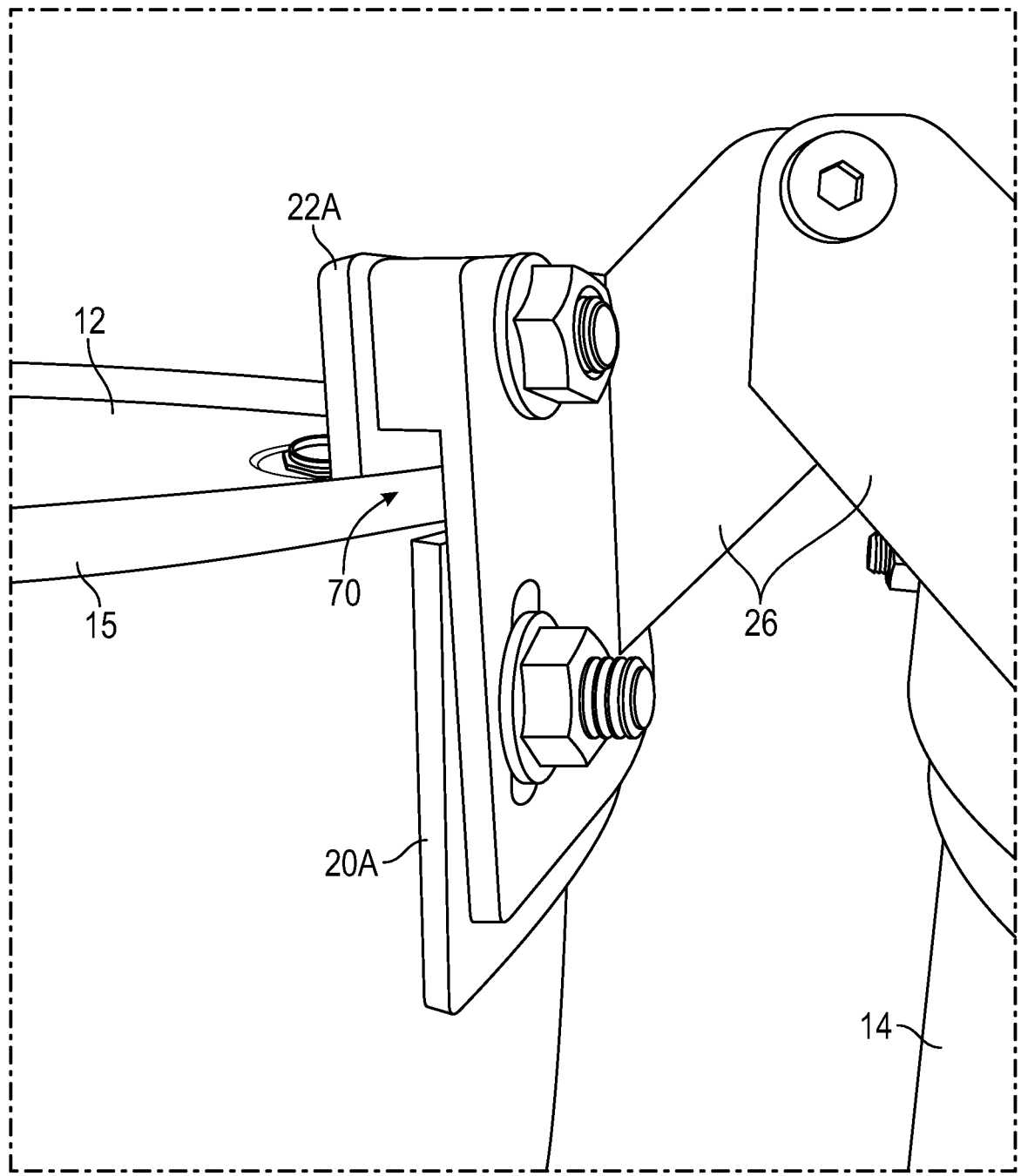
Figure 19:
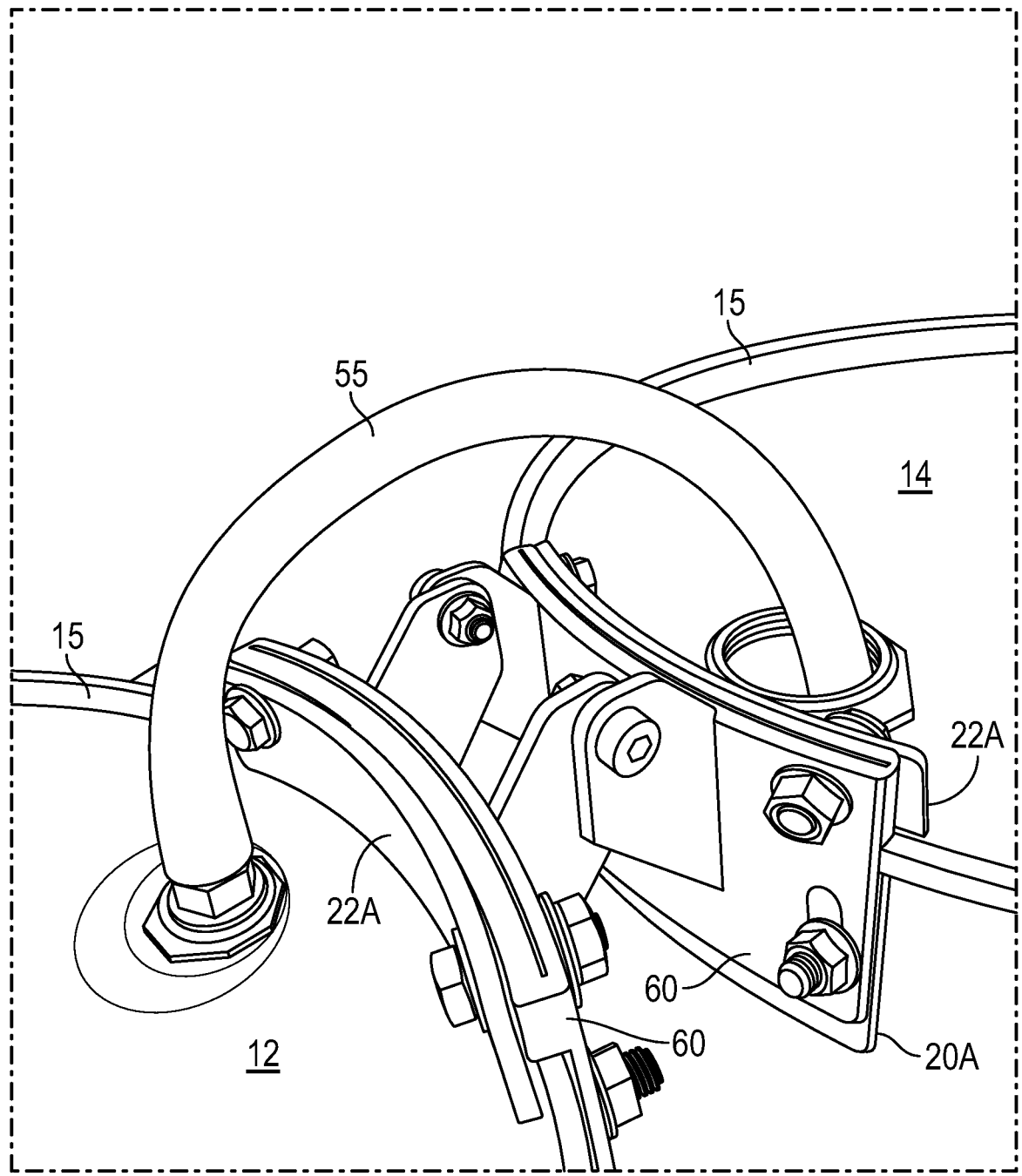
Figure 20:
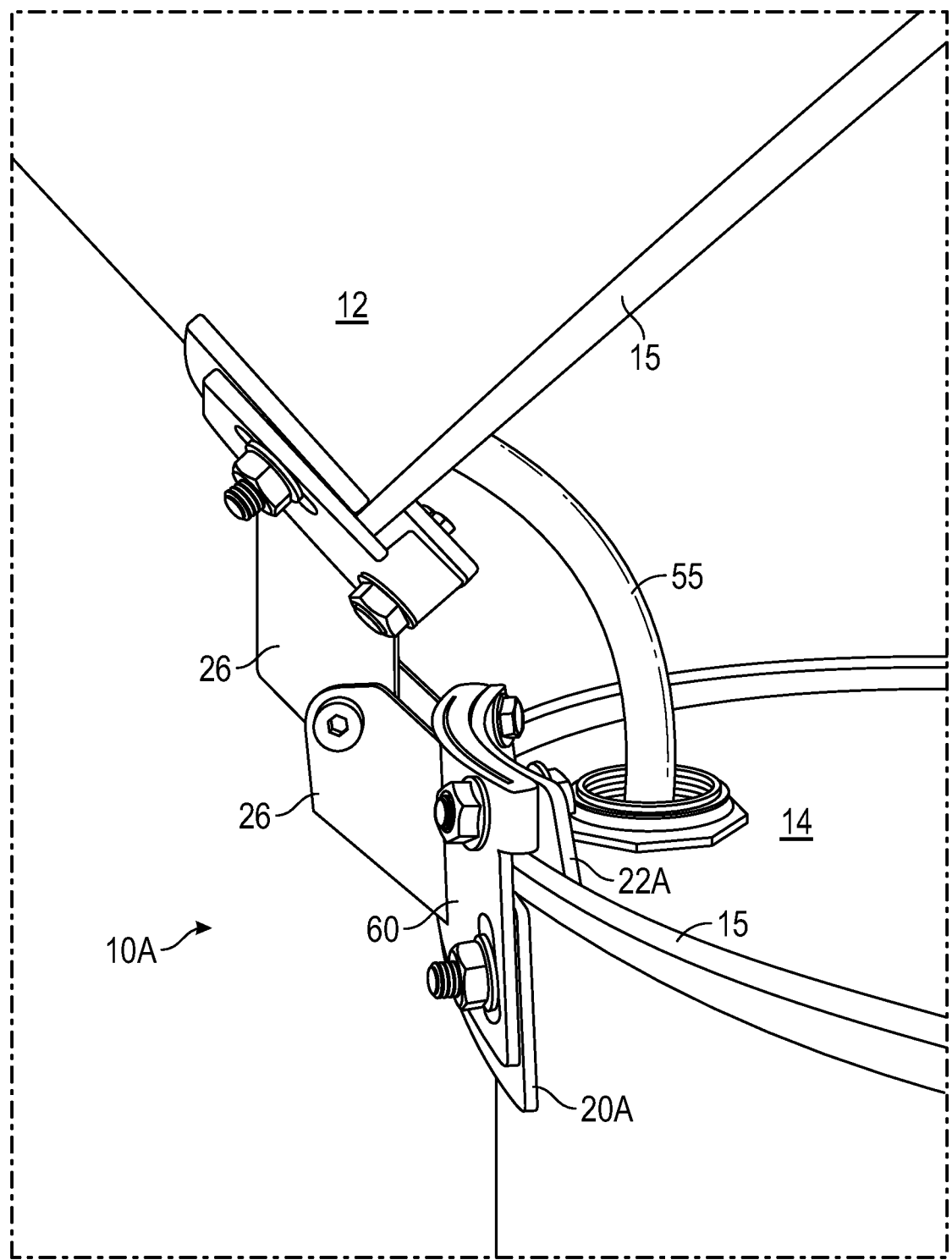

FIGS. 6-10 show a handle 40 which may be used with the hinge assembly 10, to facilitate tipping of the first drum 12. In the preferred embodiment, the handle 40 includes a lower end in the form of a U-shaped yoke 42 with opposite legs 44 and an upper end 46 terminating in a grip 48. The handle 40 is mounted to the hinge assembly 10 via a pair of the bolts or thumbscrews 50 extending through each leg 44 of the lower end 42 and into threaded apertures or plugs 49 on opposite sides of the hinge assembly 10, in place of the bolts 24 which are not used with the handle 40, as seen in FIGS. 8-10. As seen in the side elevation view of the handle 40 in FIG. 7, the legs 44 of the yoke 42 extend angularly, at approximately 45°. The end of each leg 44 includes a barrel support pad 52. The handle 40 includes barrel support pads 56, 57 as seen in FIGS. 7 and 9.

In use, the handle 40 is connected to the hinge assembly 10 by the fasteners 50, before or after the hinge assembly 10 is mounted to the drums 12, 14. The operator can then pull the grip 48 downwardly toward the second drum 14, with the handle 40 acting as a lever to raise the first drum 12 via the lower pads 52. A drain hose, shown in FIGS. 8-10, is threaded into the drain opening on the top of the first drum 12 and extended through a hose guide 58 extending between the yoke legs 44. As the handle 40 is pulled further, the end of the hose can be inserted into the opening on the top of the second drum 14. Upward tipping of the first drum 12 continues until the first drum 12 is over the second drum 14, as seen in FIG. 10 to fully drain the first drum 12 into the second drum 14. The pads 56, 57 engage the tops of the drums 14, 12, respectively to support the first drum above the second drum during draining. When the first drum is empty, the operator can lower the first drum 12 slowly via the handle 40 and, the hinge assembly 10 can be detached from the drums 12, 14.

The hinge assembly may include a rachet mechanism on the arms 26 to control movement of the arms. More particularly, the rachet mechanism will allow the arms to incrementally fold or move from the initial open position to the folded closed position with the first drum 12 raised. The rachet mechanism can be released to allow the arms 26 to fold back to the open to set the empty drum 12 down.

In a second embodiment shown in FIGS. 11-20, the hinge device 10A is adjustable to accommodate different shaped or sized drum rims 15. More particularly, the arms 26 each side of the hinge 10A are welded or otherwise fixed to a support plate 60, which has a pair of vertically extending slots 62. The outer plate 20A has a pair of threaded stub shafts 64 extending through the slots 62. Nuts 66 are tightened on the stub shafts 64 to fix the vertical position of the outer plate 20A on the support plate 60. The inner plate 22A has a pair of vertically extending slots 68. Bolts 70 extend through the slots 68 and through an aligned hole in the support plate 60. Nuts 72 are welded on the outside of the support plate 60 for receipt of the bolts 70. The bolts 70 can be tightened to fix the vertical position of the inner plate 20A relative to the support plate.

Thus, each of the plates 20A and 22A on each side 16, 18 of the hinge assembly 10A is adjustable so that the hinge assembly is mountable on drums having different rims 15. The plates 20A and 22A are vertically and horizontally offset relative to one another on each left and right sides of the hinge assembly 10A, and define a space 74 therebetween for receiving the rim 15 of the respective drums or barrels 12, 14.

The adjustable hinge assembly 10A functions identically to the hinge assembly 10 after mounting on the drums/barrels 12, 14. After the nuts 66 and bolts 70 are tightened to secure the assembly 10A to the drums, one of the drums can be lifted or raised to pour liquid into the other drum. The handle 40 can also be used with the adjustable assembly 10A, if desired.

The hinges 10, 10A are clamped to the drums or barrels, without penetrating the barrels, or otherwise screwing or bolting the hinges to the barrels. Thus the barrels are not damaged or altered by the hinge assemblies.

The invention has been shown and described above with the preferred embodiments, and it is understood that many modifications, substitutions, and additions may be made which are within the intended spirit and scope of the invention. From the foregoing, it can be seen that the present invention accomplishes at least all of its stated objectives.

What is claimed is:

1. A hinge assembly for consolidating fluid from a first barrel to a second barrel, comprising: opposite first and second sides pivotally connected to one another and attachable to an upper rim of each of the first and second barrels, respectively, to define a horizontal pivot axis; whereby the first barrel can be pivoted upwardly about the pivot axis to drain fluid from the first barrel into the second barrel; wherein each side of the hinge includes a curved member to substantially match the curved upper rims of the barrels; wherein each curved member includes an inner plate and an outer plate which are adapted to clamp the rims of each one of the barrels between the inner and outer plates, so as to mount the hinge assembly to the first and second barrels.

2. The hinge assembly of claim 1 wherein the pivot axis is above the barrels.

3. The hinge assembly of claim 1 wherein each inner plate includes a notch to receive the rim of the respective barrel.

4. The hinge assembly of claim 1 wherein the inner and outer plates are vertically adjustable.

5. The hinge assembly of claim 1 further comprising an adjustment bolt extending through the inner plate and into a threaded nut on the outer plate.

6. The hinge assembly of claim 1 wherein each side of hinge further includes a pair of arms extending toward one another from the curved members, with at least one pivot pin extending though the arms to define the pivot axis.

7. The hinge assembly of claim 1 further comprising a lever handle assembly connected to the hinge to facilitate pivotal movement of the first barrel.

8. A method of draining fluid from a first drum to a second drum, comprising: providing a hinge, wherein each side of the hinge includes a curved member to substantially match curved upper rims of the drums; wherein each curved member includes an inner plate and an outer plate which are adapted to clamp the rims of each one of the drums between the inner and outer plates so as to mount the hinge assembly to the first and second drums; securing opposite sides of the hinge to an upper rim of each drum; tipping the first drum upwardly about a horizontal axis of the hinge so that fluid from the first drum pours into the second drum.

9. The method of claim 8 wherein the hinge is the only connection between the drums.

10. The method of claim 8 further comprising connecting a drain spout to the first drum and inserting the drain spout into the second drum when the first drum is tipped upwardly.

11. The method of claim 8 further comprising inserting a funnel into the second drum and aligning an upper outlet on the first drum above the funnel when the first drum is tipped upwardly to allow fluid in the first drum to drain through the funnel into the second drum.

12. The method of claim 8 wherein the sides of the hinge are secured to the drums by clamping action.

13. The method of claim 8 wherein the hinge is secured to the drums without penetrating the drums.

14. The method of claim 8 wherein tipping of the first drum is accomplished by pulling on a handle attached to the hinge and engaging the first drum.

15. A hinge assembly for use with drums having a sidewall and an upper rim, comprising: a first clamp mountable to the upper rim of a first drum; a second clamp mountable to the upper rim of a second drum; the first and second clamps being pivotally connected to one another with a horizontal pivot axis, such that the first drum can be raised upwardly about the pivot axis to drain liquid in the first drum into the second drum while the second drum remains stationary; wherein each side of the clamp includes a curved member to substantially match curved upper rims of the drums; wherein each curved member includes an inner plate and an outer plate which are adapted to clamp the rims of each one of the drums between the inner and outer plates so as to mount the clamp assembly to the first and second drums.

16. The hinge assembly of claim 15 wherein each clamp incudes an inner plate and an outer plate adapted to sandwich the rim of one of the drums therebetween.

17. The hinge assembly of claim 16 wherein the inner and outer plates are vertically adjustable.

18. The hinge assembly of claim 15 further comprising a handle connected to one of the clamps to assist in raising the first drum.

* * * * *